United States Patent Office 2,787,617
Patented Apr. 2, 1957

2,787,617

DERIVATIVES OF OXOPIPERAZINOALKYLHALO-PHENOTHIAZINES

John W. Cusic, Skokie, Harman S. Lowrie, Northbrook, and Henry William Sause, Deerfield, Ill., assignors to G. D. Searle & Co., Chicago, Ill., a corporation of Illinois No Drawing. Application September 20, 1955, Serial No. 535,522

7 Claims. (Cl. 260—243)

The present invention relates to a new group of oxopiperazine derivatives and, more particularly, to derivatives of oxopiperazinoalkylhalophenothiazines which can be represented by the general structural formula

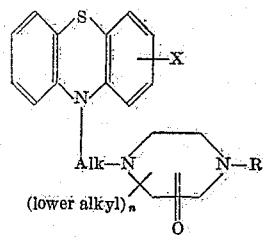

and the non-toxic salts thereof, wherein $n$ is 0, 1, or 2, X is fluorine or chlorine, Alk is a lower alkylene radical and R is a member of the class consisting of hydrogen, lower alkyl and lower aralkyl radicals.

In the foregoing structural formula Alk represents a bivalent, saturated aliphatic hydrocarbon radical derived from a straight or branched chain hydrocarbon such as ethylene, propylene, butylene, amylene, hexylene or a polymethylene radical such as trimethylene, tetramethylene, pentamethylene and hexamethylene. The radical R can represent a lower alkyl radical such as methyl, ethyl, straight and branched propyl, butyl, amyl and hexyl radicals. It can also represent an aralkyl radical such as benzyl, phenethyl, tolylmethyl and the like.

The organic bases of the foregoing type form pharmaceutically acceptable non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The oxopiperazine derivatives of this invention have valuable pharmacological properties, particularly in the production of ataraxia in states of hyperirritability. They also are anti-emetic agents. A special advantage of these compounds over other halophenothiazine derivatives is their relative freedom from toxic side reactions.

The compounds of this invention are conveniently prepared by the condensation of a compound of the structural formula

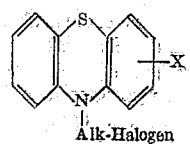

with an oxopiperazine of the type

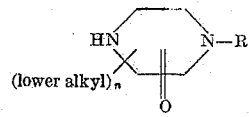

An alternative method for preparing these compounds consists in the treatment of a halophenothiazine with a compound of the type

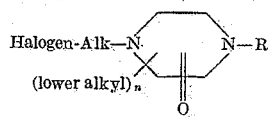

The 4'-substituted derivatives can also be prepared by alkylation or acylation of the corresponding oxopiperazinoalkyl-halophenothiazines.

The following examples will illustrate in further detail the compounds which constitute this invention and the production thereof. However, it should be understood that these examples are given by way of illustration only and are not to be construed as limiting the invention in spirit or in scope. In these examples temperatures are given uncorrected in degrees centigrade (°C.), quantities in parts by weight, and pressures in millimeters (mm.) of mercury.

*Example 1*

A mixture of 89.3 parts of 2-chloro-10-($\beta$-chloroethyl)-phenothiazine, 30 parts of 2-piperazinone and 45.4 parts of sodium iodide in 1000 parts of butanone is stirred and refluxed for 24 hours. The mixture is cooled, filtered, and evaporated to dryness and the resulting oil is dissolved in a mixture of ether and benzene, washed first with 5% sodium carbonate and then with water. The resulting organic layer is extracted with dilute hydrochloric acid. The extract is made alkaline with dilute sodium hydroxide and extracted with benzene. This extract is washed with water, dried over anhydrous potassium carbonate, filtered and evaporated. The residue is distilled in a short-path distillation tube at 0.5–2 mm. pressure and about 260–270° C. to yield 2-chloro-10-[$\beta$-(3'-oxopiperazinyl)ethyl]phenothiazine.

Use of 211 parts of 3-chloro-10-($\beta$-chloroethyl)phenothiazine instead of the 2-chloro isomer used hereinabove yields 3-chloro-10-[$\beta$-(3'-oxopiperazinyl)ethyl]phenothiazine which is distilled at about 0.1 mm. pressure and a jacket temperature of about 250° C.

*Example 2*

A mixture of 68 parts of 2-piperazinone, 211 parts of 2-chloro-10-($\gamma$-chloropropyl)phenothiazine, 48 parts of potassium carbonate and 102 parts of sodium iodide is prepared in 4000 parts of butanone, stirred for 16 hours, and then refluxed and stirred for 8 hours. The mixture is cooled, filtered, and evaporated to dryness. The resulting oil is dissolved in benzene, washed with water and then extracted with dilute hydrochloric acid. The extract is made alkaline with dilute sodium hydroxide and extracted with benzene. This extract is washed with water, dried over anhydrous potassium carbonate, filtered and evaporated. Vacuum distillation at 0.1 mm. pressure in a short-path distillation tube by heating the jacket to about 250° C. yields 2-chloro-10-[$\gamma$-(3'-oxopiperazinyl)-propyl]phenothiazine. On recrystallization from 2-propanol white crystals are obtained which melt at about 132–135° C.

A solution of this base in a mixture of ethanol and benzene is treated with an excess of anhydrous hydrogen chloride in 2-propanol. The cooled mono-hydrochloride precipitates and melts after drying at about 197–203° C. This salt has the structural formula

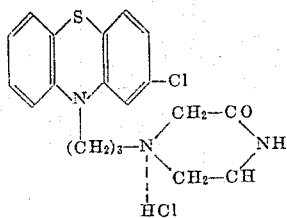

Example 3

A mixture of 43.1 parts of 2 - chloro - 10-(β-chloropropyl)phenothiazine, 14 parts of 2-piperazinone, 20.9 parts of sodium iodide and 440 parts of butanone is refluxed for 40 hours and then concentrated to a small volume. The residue is taken up in water and ether. The ether layer is separated, washed with water and extracted with 2-N hydrochloric acid. This extract is made alkaline by addition of 6-N sodium hydroxide and extracted with ether. The ether solution is washed to neutrality, dried over potassium carbonate, and evaporated to yield 2 - chloro - 10-[β-(3'-oxopiperazinyl)-propyl]-phenothiazine melting at about 90–96° C.

Example 4

13 parts of N-phenyl - 4 - fluoroanthranilic acid are heated to about 270° C. for 90 minutes and then dissolved in ether. The ether solution is washed with 2-N sodium hydroxide and with water and then dried over anhydrous sodium sulfate. After evaporation of the ether the residue is distilled at about 0.05 mm. pressure and 70° C. to yield m-fluorodiphenylamine as a colorless oil. A mixture of 3.7 parts of this oil, 1.3 parts of sulfur and 0.1 part of iodine are heated at 180–185° C. for an hour. The residue is sublimed in vacuum and then crystallized repeatedly from ethanol to yield 2-fluorophenothiazine melting at about 200–201° C.

A solution of 217 parts of 2-fluorophenothiazine in 550 parts of ether is treated under a nitrogen atmosphere by gradual addition with 64 parts of butyl lithium in 500 parts of ether. The mixture is stirred and then treated with 263 parts of δ-chlorobutyl p-toluenesulfonate and 200 parts of ether. After an hour of stirring, there is added a solution of 180 parts of concentrated hydrochloric acid in 300 parts of water, after which the hydrolyzed mixture is filtered. The organic layer is separated from the filtrate, washed with water and concentrated to yield 2-fluoro - 10 - (δ-chlorobutyl)phenothiazine.

A mixture of 6.2 parts of this compound, 3 parts of sodium iodide, 10 parts of 2-piperazinone and 400 parts of butanone is refluxed for 8 hours and then concentrated. The residue is extracted with dilute hydrochloric acid. This extract is rendered alkaline by addition of dilute sodium hydroxide solution and then extracted with benzene. The benzene extract is washed with water, dried over anhydrous calcium sulfate, filtered and evaporated to yield 2 - fluoro - 10 - [δ-(3'-oxopiperazinyl)-butyl]phenothiazine which is vacuum distilled in a short-path distillation tube at 0.5–2 mm. pressure by heating the jacket to about 250° C.

Example 5

A mixture of 6.2 parts of 2-chloro - 10 - (γ-chloropropyl)phenothiazine, 2.3 parts of 3-methyl - 2 - piperazinone, 1.4 parts of potassium carbonate and 3 parts of sodium iodide in 400 parts of butanone are stirred at room temperature for 15 hours and then refluxed for 7 hours with stirring. After cooling, the reaction mixture is filtered and the filtrate is concentrated under vacuum to an oily residue. The latter is dissolved in a mixture of ether and benzene and washed successively with dilute sodium hydroxide and water and then extracted with dilute hydrochloric acid. This extract is washed with ether, rendered alkaline with dilute sodium hydroxide and extracted with a mixture of ether and benzene. This extract is washed thoroughly with water, dried and evaporated. Vacuum distillation of the residue at 0.2 mm. pressure in a short-path distillation tube by heating the jacket to about 265° C. yields 2-chloro-10-[γ-(2'-methyl-3'-oxopiperazinyl)propyl]phenothiazine. Treatment of an ethanolbenzene solution of this base with an excess of anhydrous hydrogen chloride in 2-propanol yields a mono-hydrochloride which, in crude form, melts at about 128–136° C.

Example 6

A mixture of 6.2 parts of 2-chloro - 10 - (γ-chloropropyl)phenothiazine, 2.6 parts of 3,3-dimethyl-2-piperazinone, 3 parts of sodium iodide and 1.4 parts of potassium carbonate in 160 parts of 2-butanone is permitted to stand at room temperature for 15 hours and then refluxed with stirring for 6 hours. The mixture is chilled, filtered and evaporated to dryness and the resulting oil is dissolved in benzene. This solution is washed with water and then extracted with dilute hydrochloric acid. This extract is made alkaline by addition of dilute potassium hydroxide and extracted with benzene. The benzene solution is washed with water, dried over anhydrous calcium sulfate, filtered and evaporated. Vacuum distillation at 0.2 mm. pressure and a jacket temperature of about 265° C. in a short-path distillation tube yields 2 - chloro - 10 - [γ-(2'-dimethyl-3'-oxopiperazinyl)propyl]phenothiazine. Treatment of ethanolic benzene solution of this base with 2-propanolic hydrogen chloride yields a mono-hydrochloride which melts at about 242–244° C. with decomposition. The compound has the structural formula

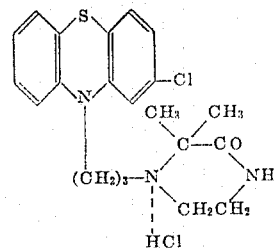

By substitution of 3-ethyl-2-piperazinone for the 3,3-dimethyl-2-piperazinone used in the preceding procedure, there is obtained 2-chloro-10-[γ-(2'-ethyl-3'-oxopiperazinyl)propyl]phenothiazine which is distilled in a short-path distillation tube at 0.1 mm. pressure and a jacket temperature of about 260° C.

Example 7

A mixture of 25 parts of 2-piperazinone, 32 parts of 90% formic acid and 23 parts of 36% formaldehyde is warmed. When the exothermic reaction has subsided the mixture is refluxed for 10 hours, cooled and then treated successively with 60 parts of solid sodium carbonate and 300 parts of chloroform. After stirring the mixture is filtered and the filtrate is vacuum distilled until an oily residue remains which crystallizes on cooling. The 1-methyl-3-piperazinone thus obtained melts at about 79–84° C. after recrystallization from ether.

A solution of 3.42 parts of this product in 40 parts of toluene is treated with 1.29 parts of sodamide and the mixture is refluxed for 2 hours. Then a solution of 9.3 parts of 2-chloro-10-(γ-chloropropyl)phenothiazine in 50 parts of dry toluene is added and refluxing is resumed for 7.5 hours. After cooling 20 parts of water are added and the organic layer is separated and extracted with dilute hydrochloric acid. This extract is rendered alkaline by addition of dilute potassium hydroxide and extracted with ether. The ether extract is dried over anhydrous calcium sulfate, filtered and evaporated and the residue is distilled in a short-path distillation tube at about 0.05 mm. pressure and a jacket temperature of 220–230° C. to yield as an oily product 2-chloro-10-[γ-(2'-oxo-4'-methylpiperazinyl)propyl]phenothiazine which has the structural formula

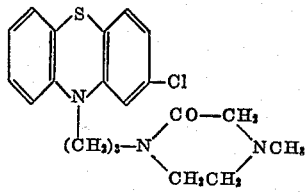

Use of an equivalent amount of 1-benzyl-3-piperazinone for the 1-methyl-3-piperazinone used hereinabove yields 2-chloro-10-[γ-(2'-oxo - 4' - benzylpiperazinyl]phenothiazine which is distilled in a short-path distillation tube at about 0.2 mm. pressure and 270° C. jacket temperature.

*Example 8*

To a solution of 10.1 parts of 2-chloro-10-[γ-(3'-oxopiperazinyl)propyl]phenothiazine in 260 parts of toluene are added 1.5 parts of sodamide. The mixture is stirred for 2 hours after which a solution of 3.6 parts of methyl iodide in 60 parts of toluene is added in small portions. The solution is heated to reflux for 5 hours and then cooled and treated with water. The organic layer is separated, washed with water and dried over anhydrous sodium carbonate, filtered and evaporated. The residue is submitted to short-path distillation at 0.05 mm. pressure and about 240° C. jacket temperature to yield 2-chloro-10-[γ-(3' - oxo - 4' - methylpiperazinyl)propyl] phenothiazine. Its crude hydrochloride melts at about 115–118° C.

Substitution of 5 parts of ethyl iodide for the methyl iodide used in the preceding procedure yields 2-chloro-10-[γ-(3' - oxo-4'-ethylpiperazinyl)propyl]phenothiazine which is distilled at 0.2 mm. pressure and 260° C. jacket temperature. Similar substitution of an equivalent amount of β-phenethyl iodide yields the 2-chloro-10-[γ-(3'-oxo-4' - phenethylpiperazinyl)propyl]phenothiazine which is distilled in a short-path distillation apparatus at about 0.2 mm. pressure and 270–280° C.

What is claimed is:

1. A compound of the structural formula

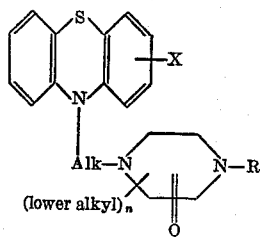

wherein $n$ is an integer between zero and two inclusive, X is a halogen atom of an atomic weight smaller than 40, Alk is a lower alkylene radical separating the two nitrogen atoms attached thereto by at least two carbon atoms, R is a member of the class consisting of hydrogen, lower alkyl radicals and phenyl-(lower alkyl) radicals.

2. A compound of the structural formula

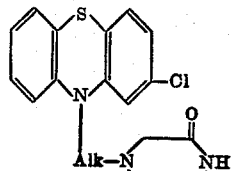

wherein Alk is a lower alkylene radical separating the two nitrogen atoms attached thereto by at least two carbon atoms.

3. A compound of the structural formula

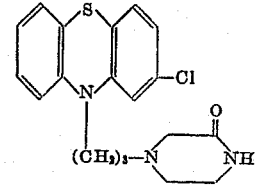

4. A compound of the structural formula

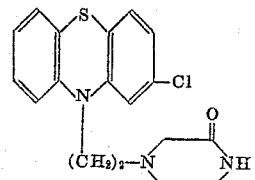

5. A compound of the structural formula

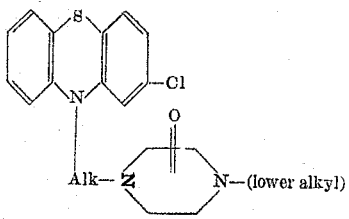

wherein Alk is a lower alkylene radical separating the two nitrogen atoms attached thereto by at least two carbon atoms.

6. A compound of the structural formula

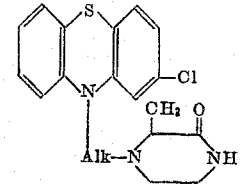

wherein Alk is a lower alkylene radical separating the two nitrogen atoms attached thereto by at least two carbon atoms.

7. A compound of the structural formula

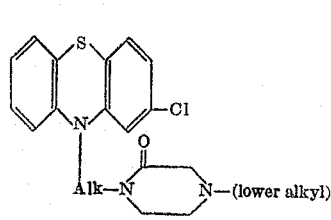

wherein Alk is a lower alkylene radical separating the two nitrogen atoms attached thereto by at least two carbon atoms.

No references cited.